US012656289B2

(12) United States Patent
Tobey et al.

(10) Patent No.: US 12,656,289 B2
(45) Date of Patent: Jun. 16, 2026

(54) ION CONCENTRATION PROBE WITH ENHANCED SHIELDING

(71) Applicant: Thermo Orion Inc., Chelmsford, MA (US)

(72) Inventors: Arthur E. Tobey, Salem, NH (US); Xiaowen Wen, Lexington, MA (US); James M. Stark, Worcester, MA (US); Andrea F. Gulla, Billerica, MA (US)

(73) Assignee: Thermo Orion, Inc., Chelmsford, MA (US)

( * ) Notice: Subject to any disclaimer, the term of this patent is extended or adjusted under 35 U.S.C. 154(b) by 885 days.

(21) Appl. No.: 17/777,698

(22) PCT Filed: Nov. 17, 2020

(86) PCT No.: PCT/US2020/060862
§ 371 (c)(1),
(2) Date: May 18, 2022

(87) PCT Pub. No.: WO2021/101877
PCT Pub. Date: May 27, 2021

(65) Prior Publication Data
US 2022/0404306 A1 Dec. 22, 2022

Related U.S. Application Data

(60) Provisional application No. 62/936,850, filed on Nov. 18, 2019.

(51) Int. Cl.
| *G01N 27/28* | (2006.01) |
| *G01N 27/36* | (2006.01) |
| *G01N 27/403* | (2006.01) |

(52) U.S. Cl.
CPC ........... *G01N 27/286* (2013.01); *G01N 27/36* (2013.01); *G01N 27/4035* (2013.01)

(58) Field of Classification Search
CPC .. G01N 27/286; G01N 27/36; G01N 27/4035; G01N 27/302; G01N 27/413
See application file for complete search history.

(56) References Cited

U.S. PATENT DOCUMENTS

| 4,608,148 A | 8/1986 | Frollini, Jr. et al. |
| 2003/0132755 A1* | 7/2003 | Feng .................... G01N 27/401 |
| | | 324/438 |

(Continued)

FOREIGN PATENT DOCUMENTS

| DE | 102005033727 A1 | 1/2007 |
| DE | 102008055107 A1 | 7/2010 |

(Continued)

OTHER PUBLICATIONS

Ito et al., English translation of JP-2014206507-A, 2014 (Year: 2014).*

(Continued)

*Primary Examiner* — Shizhi Qian
(74) *Attorney, Agent, or Firm* — BakerHostetler

(57) ABSTRACT

A probe for measuring a sample solution includes an outer body configured to receive an operational amount of a reference solution, and a sensor assembly including an inner body at least a portion of which is located inside the outer body. A shield is positioned between the outer surface of the inner body and the inner surface of the outer body. The shield is configured to be in contact with the reference solution and extends above the top surface of the reference solution when the probe is filled with an operational amount of the reference solution.

19 Claims, 5 Drawing Sheets

(56)     References Cited

U.S. PATENT DOCUMENTS

| | | | |
|---|---|---|---|
| 2006/0001431 A1* | 1/2006 | Adami | G01N 27/4035 |
| | | | 324/446 |
| 2008/0283399 A1 | 11/2008 | Feng et al. | |
| 2009/0101524 A1* | 4/2009 | Woodward | G01N 27/36 |
| | | | 204/406 |
| 2009/0301874 A1 | 12/2009 | Auerswald et al. | |
| 2011/0048971 A1 | 3/2011 | Bower et al. | |
| 2018/0095054 A1* | 4/2018 | Huo | G01N 27/026 |

FOREIGN PATENT DOCUMENTS

| | | | |
|---|---|---|---|
| EP | 1610120 A1 | | 12/2005 |
| JP | 2014206507 A | * | 10/2014 |

OTHER PUBLICATIONS

Thought, Table of Electrical Resistivity and Conductivity, https://www.thoughtco.com/table-of-electrical-resistivity-conductivity-608499, accessed on Jun. 13, 2025 (Year: 2025).*

"Electrodes de verre: références internes tout solide", Mesures. Régulation Automatisme Controle, vol. 51, No. 12, Oct. 1, 1986 (Oct. 1, 1986), p. 103-113, XP001328811, p. 111; figure 1.

European Patent Office, International Search Report and Written Opinon of the International Searching Authority, International Application No. PCT/US2020/060862, mailed Mar. 15, 2021 (15 pages).

The International Bureau of WIPO, International Preliminary Report On Patentability, International Application No. PCT/US2020/060862, mailed Jun. 2, 2022 (9 pages).

* cited by examiner

1

ION CONCENTRATION PROBE WITH ENHANCED SHIELDING

CROSS-REFERENCE TO RELATED APPLICATION

The present application is a U.S. National Stage entry under 35 U.S.C. § 371 of, and claims priority to, International Application No. PCT/US2020/060862, filed Nov. 17, 2020, which claims the filing benefit of U.S. Provisional Application Ser. No. 62/936,850, filed Nov. 18, 2019, the disclosures of which are hereby incorporated herein by reference in their entireties.

FIELD OF THE INVENTION

The present invention generally relates to ion concentration measurements and, in particular, to ion concentration probes having enhanced shielding.

BACKGROUND

Electrode-based ion measurement systems typically include a sensing electrode responsive to the specific ions being measured, and a reference electrode that provides a stable potential against which the sensing electrode potential is compared. In the case of a pH measurement system, the sensing electrode is commonly a glass-based pH electrode. Glass-based pH electrodes often have a very high impedance and generate extremely weak voltage signals. These weak voltage signals can make acquiring accurate measurements difficult, and create challenges in designing both the electrodes and the measurement system to achieve optimal performance. The weak voltage signals are compounded by the tendency of the electrode's high impedance to pick up electro-magnetic interference.

To reduce electro-magnetic interference, e.g., due to moving static charges from hands, lab coats, etc., and from local electrical noise, the electrode is typically shielded from outside signals. Conventional shielding involves wrapping a conductive material such as copper foil around the electrode body and connecting the conductive material directly to the reference electrode, which in turn is connected to the meter ground. However, this method of shielding is not adaptable to a probe having a combined sensing-reference electrode. Combined sensing-reference electrodes include a conductive reference solution in which the reference electrode is submerged and that surrounds the sensing electrode body. Conventional approaches to shielding these types of probes rely on shielding provided by the reference solution below a fill line, and conductive materials wrapped around the outer body and connected to the meter ground above the fill line.

The above shielding approaches complicate electrode design and increase the difficulty of manufacturing probes. In addition, competing design requirements inside the electrode tend to limit the effectiveness of conventional shielding. Thus, there is a need for improved apparatuses and methods of shielding sensing electrodes used in ion measurement systems.

SUMMARY

In an embodiment of the present invention, a probe for measuring a first solution is provided. The probe includes an outer body, a sensor assembly, and a shield. The outer body has an inner surface and is configured to receive an operational amount of a second solution having a top surface. The sensor assembly includes an inner body having an outer surface, and at least a portion of the inner body is located inside the outer body. The shield is positioned between the outer surface of the inner body and the inner surface of the outer body, and is configured to be in contact with the second solution and extend above the top surface of the second solution when the probe is filled with the operational amount of the second solution during use of the probe.

In an aspect of the present invention, the probe may further include a reference electrode, and at least a portion of the reference electrode may be located inside the outer body, outside the inner body, and contact the second solution when the probe is filled with the operational amount of the second solution.

In another aspect of the present invention, the reference electrode may be positioned in the outer body so that there is a first gap between the shield and the reference electrode.

In another aspect of the present invention, the shield may have an inner surface, and the first gap may be between the reference electrode and the inner surface of the shield.

In another aspect of the present invention, the shield may have an outer surface, and the first gap may be between the reference electrode and the outer surface of the shield.

In another aspect of the present invention, the shield may be electrically coupled to the reference electrode through the second solution when the probe is filled with the operational amount of the second solution.

In another aspect of the present invention, the probe may further include a connector having a ground conductor, and the shield may be electrically coupled to the ground conductor of the connector.

In another aspect of the present invention, the shield may extend above the top surface of the second solution to the connector.

In another aspect of the present invention, the shield may be electrically coupled to the ground conductor of the connector at the connector.

In another aspect of the present invention, the reference electrode may be electrically coupled to the ground conductor of the connector.

In another aspect of the present invention, the shield may be electrically coupled to the ground conductor of the connector through the second solution and the reference electrode.

In another aspect of the present invention, the probe may further include a liquid junction configured to electrically couple electric charge between the first solution and the second solution when the probe is filled with the operational amount of the second solution and immersed in the first solution during use of the probe.

In another aspect of the present invention, the shield may be electrically coupled to a meter ground through the second solution and the liquid junction.

In another aspect of the present invention, the inner body may include a lower end having a chamber with an upper portion and a lower portion, and the lower portion of the chamber may be defined by a membrane that is joined to the upper portion of the chamber so that a joint is formed between the membrane and the upper portion of the chamber.

In another aspect of the present invention, the outer body may include a lower end having an opening, the inner body and the outer body may be configured so that there is a fluid-tight seal between the inner body and the outer body at the opening, and the joint between the membrane and the upper portion of the chamber may be below the fluid-tight seal so that the membrane does not contact the second solution when the probe is filled with the operational amount of the second solution.

In another aspect of the present invention, the membrane may include a first material that allows ion exchange, and the upper portion of the chamber may include a second material that is electrically insulating.

In another aspect of the present invention, the sensor assembly may further include a third solution inside the inner body, and a sensing electrode at least a portion of which is inside the inner body and in contact with the third solution.

In another aspect of the present invention, the shield may be in contact with the outer surface of the inner body.

In another aspect of the present invention, the shield may have an inner surface and an outer surface, and there may be a second gap between the inner surface of the shield and the outer surface of the inner body, and a third gap between the outer surface of the shield and the inner surface of the outer body.

The above summary presents a simplified overview of some embodiments of the present invention to provide a basic understanding of certain aspects of the present invention discussed herein. The summary is not intended to provide an extensive overview of the present invention, nor is it intended to identify any key or critical elements, or delineate the scope of the present invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate embodiments of the invention and, together with a general description of the invention given above, and the detailed description of the invention given below, serve to explain the principles of the invention.

DETAILED DESCRIPTION

Embodiments of the present invention enhance the coverage and effectiveness of pH and ion selective electrode internal electrical shielding. The improvements in shielding may also improve manufacturability by reducing the need for wires in the probe, and enhance shielding provided by the reference solution below a fill line defined by a top surface of the reference solution.

Figures 1, 2:
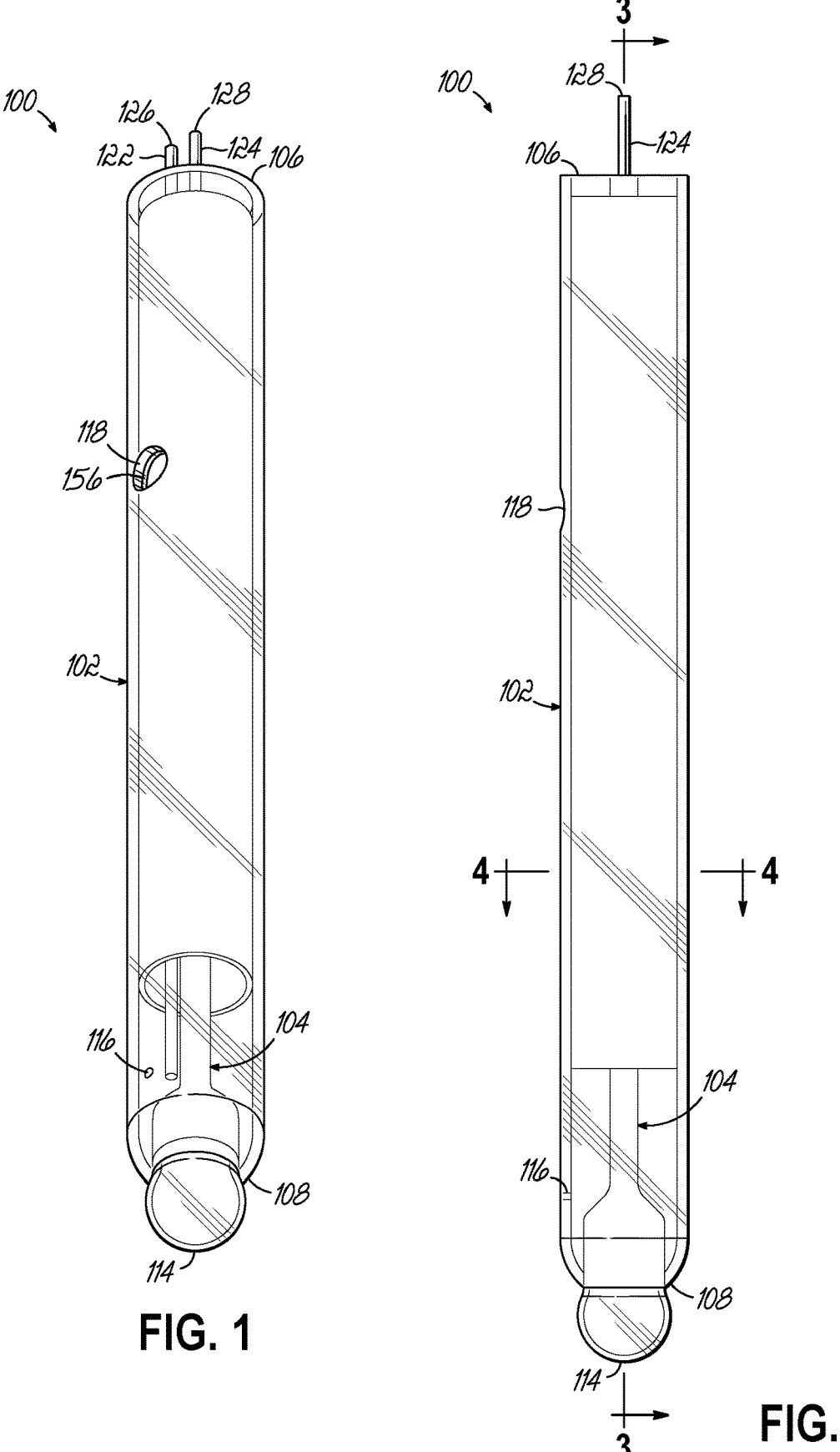
FIG. 1 is a perspective view of an exemplary probe in accordance with an embodiment of the present invention.
FIG. 2 is a schematic front view of the probe of FIG. 1.
Figure 3:
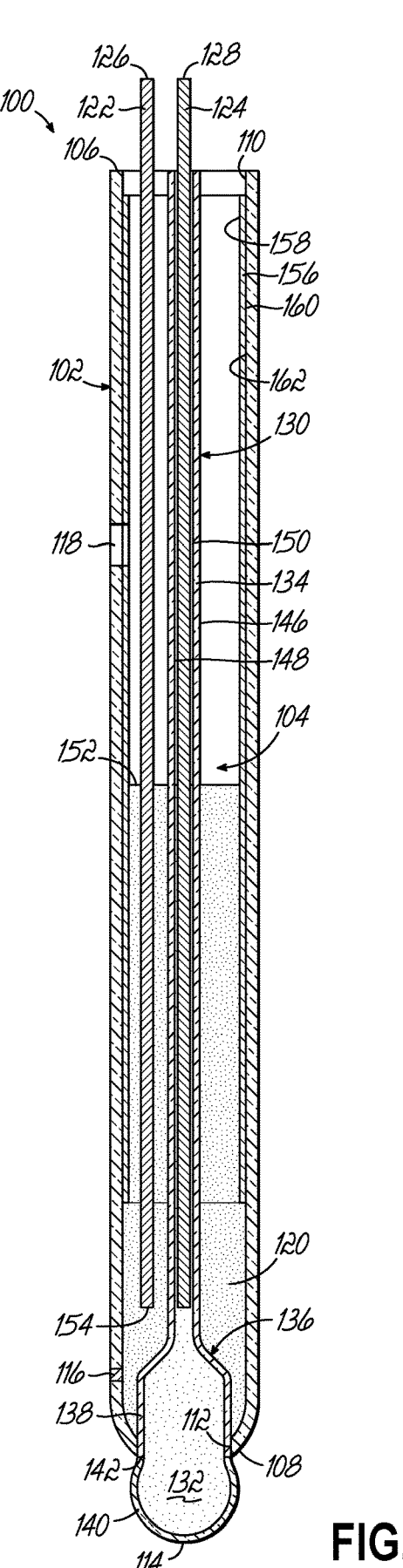
FIG. 3 is a vertical cross-sectional view of the probe of FIG. 2.

FIGS. 1 and 2 depict a probe 100 in accordance with an embodiment of the present invention. The probe 100 includes a hollow cylindrical outer body 102 and a sensor assembly 104. The outer body 102 includes an upper end 106 and a lower end 108 each including a respective opening 110, 112 (FIG. 3). The probe 100 further includes a membrane 114 (e.g., a glass membrane) that extends outward from the opening 112 at the lower end 108 of outer body 102. The membrane 114 may be part of the sensor assembly 104, and may be flat, curved (e.g., round), or have any other suitable shape. The membrane 114 is formed from a material that is sensitive to one or more specific types of ion, such as hydrogen ions. Suitable materials for the membrane 114 may include a doped glass, a crystal, a polymer, or another type of material that allows ion exchange. The outer body 102 is formed of an electrically insulating material (e.g., a silicate based glass or chemically resistant plastic), and includes a liquid junction 116 and a fill hole 118. The fill hole 118 provides an opening through which a reference solution 120 (FIG. 3) can be added to the probe 100.

The liquid junction 116 of outer body 102 may comprise a hole filled or otherwise plugged with a porous material (e.g., a ceramic or capillary material) that allows a sample solution in which the probe 100 is immersed to exchange electrical charges (e.g., ions, protons, or electrons) with the reference solution 120. The liquid junction 116 may be located on the outer body 102 so that the liquid junction 116 is in contact with both the reference solution 120 and the sample solution (not shown) while the sample solution is being measured by the probe 100. The liquid junction 116 may have any suitable shape, e.g., a circular shape, and provides a path for electrical current to flow between the reference and sample solutions.

The probe 100 further includes a reference electrode 122 and a sensing electrode 124. A portion of each electrode 122, 124 may extend outward from the upper end 106 of outer body 102 to form a respective terminal 126, 128. The terminals 126, 128 may be configured to connect the probe 100 to a measuring device, such as a pH meter (not shown).

Figure 4:
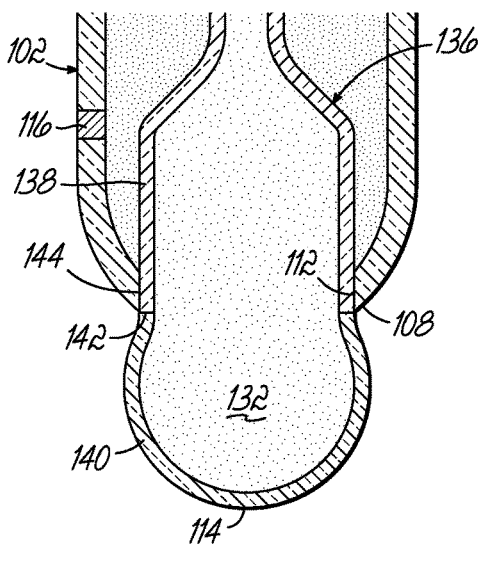
FIG. 4 is an enlarged view of a portion of the probe of FIG. 3 showing additional details of the probe.
Figure 5:
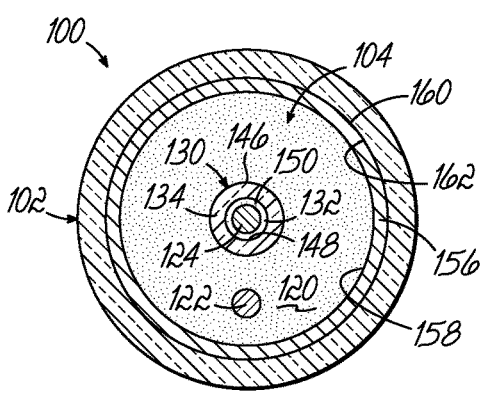
FIG. 5 is a horizontal cross-sectional view of the probe of FIG. 2.

Referring now to FIGS. 3-5, and with continued reference to FIGS. 1 and 2, FIG. 3 is a cross-sectional view taken along line 3 of FIG. 2, FIG. 4 is an enlarged portion of the cross-sectional view of FIG. 3, and FIG. 5 is a cross-sectional view taken along line 4 of FIG. 2 for an embodiment of the probe 100. The sensor assembly 104 includes the sensing electrode 124 and an inner body 130 configured to receive an amount of a sensing solution 132 that at least partially fills the inner body 130. The inner body 130 includes a hollow stem 134 in fluid communication with a chamber 136 having an upper portion 138 and a lower portion 140. The lower portion 140 of chamber 136 may be defined by the membrane 114, and the upper portion 138 of chamber 136 may be defined by a section of the inner body 130 that joins the membrane 114 to the stem 134. In an embodiment of the invention, the upper portion 138 of chamber 136 may be provided by a flared or otherwise expanded portion of the stem 134.

The chamber 136 may be formed by fusing or otherwise joining the membrane 114 to the upper portion 138 of chamber 136. This fusing may form a joint 142 between the membrane 114 and the upper portion 138 of chamber 136. The chamber 136 may form a fluid-tight seal 144 (FIG. 4)

with the opening 112 at the lower end 108 of outer body 102. The seal 144 may be located proximate to, or above, the joint 142 of chamber 136 so that the external surface of membrane 114 does not contact the reference solution 120. The seal 144 may be provided by a gasket or other sealing member or material, by fusing an outer surface of the chamber 136 to the outer body 102 along a perimeter of the opening 112, or by any other suitable method.

The sensing electrode 124 may extend into the inner body 130 through an opening at an upper end of the stem 134. The stem 134 includes an outer surface 146 and an inner surface 148. The stem 134 may have an inside diameter slightly larger than the diameter of the sensing electrode 124 so that there is a gap 150 between the outer surface of the sensing electrode 124 and the inner surface 148 of the stem 134. The gap 150 may be filled with sensing solution 132 along at least a portion of the length of the stem 134.

The membrane 114 may protrude through or otherwise span at least a portion of the opening 112 of outer body 102 so that the membrane 114 is exposed to the sample solution when the probe 100 is immersed therein. The sensing solution 132 may include a buffered potassium chloride solution or other electrolytic solution having a concentration, for example, of between 0.01 and 5.0 molar, and may be in contact with at least a portion of the sensing electrode 124.

Desirable characteristics of the material used to form the membrane 114 may include a relatively low electrical resistance and a high resistance to chemicals. Details regarding materials suitable for making the membrane 114 can be found in U.S. Pat. Nos. 4,297,193 and 4,028,196, the disclosures of which are incorporated by reference herein in their entireties. In contrast, the stem 134 and upper portion 138 of chamber 136 may be made from a glass or other suitable material that is not responsive to the ions being measured. Desirable characteristics of this material may include low-conductivity and high resistance to chemicals.

The space between the outer body 102 and the inner body 130 may contain the reference solution 120. The reference solution 120 has a top surface 152, and may include a potassium chloride solution or other electrolytic solution having a concentration, for example, of between 0.01 and 5.0 molar. The reference solution 120 may be added to the probe 100 through the fill hole 118 in an amount sufficient to allow the reference solution 120 to be in contact with a lower portion 154 of reference electrode 122.

The probe 100 further includes an electro-magnetic shield 156 having an inner surface 158 and an outer surface 160. The shield 156 may be located between the outer body 102 and inner body 130 along at least a portion of the length of the outer body 102. The shield 156 may comprise a layer of conductive material deposited on, or otherwise in contact with, an inner surface 162 of outer body 102, such as a length of tubing inserted into the outer body 102. This tubing may have an outside diameter the same as or slightly smaller than the inside diameter of the outer body 102. The shield 156 may be held in place by friction with the inner surface 162 of outer body 102, or by any other suitable method, such as an adhesive, retaining clips, etc.

The shield 156 may extend along the length of the outer body 102 from below the top surface 152 of reference solution 120 to, or just short of, the upper end 106 of outer body 102. The shield 156 may extend shielding of the sensor assembly 104 provided by the reference solution 120 above the top surface 152 of reference solution 120. The reference solution 120 may be grounded (or otherwise coupled to a reference voltage, e.g., meter ground) through the reference electrode 122, thereby providing shielding to the portion of the sensor assembly 104 below the top surface 152 of reference solution 120.

The maximum amount of reference solution 120 that may be added to the probe 100 may be an amount that maintains the top surface 152 of reference solution 120 at or immediately below the fill hole 118. The minimum amount of reference solution 120 that may be added to the probe 100 may be an amount sufficient to maintain the top surface 152 of reference solution 120 above the lower end 154 of reference electrode 122 and the lower end of the shield 156. Thus, an operational amount of reference solution may be an amount that produces an operational fill level between the minimum and maximum fill levels, and results in at least a portion of both the reference electrode 122 and the shield 156 being in contact with the reference solution 120 during use of the probe 100.

In an embodiment of the present invention, the shield 156 may be electrically coupled to the ground conductor of a cable connecting the probe 100 to the meter. This electrical coupling to ground may be through the reference solution 120 via the reference electrode 122, through a direct connection to the ground conductor of the cable connecting the probe 100 to the meter, or through both the reference solution 120 and a direct connection to the ground conductor. For embodiments in which the shield 156 is connected directly to the ground conductor, the shield 156 may also serve as a reference electrode, in which case the reference electrode 122 may be omitted.

By way of example, the cable may include a center conductor that is operatively coupled to the sensing electrode 124, a tubular inner insulating layer surrounding the center conductor, a tubular outer conducive layer surrounding the insulating layer that is operatively coupled to the reference electrode 122, and an outer insulating layer or jacket. The outer conducive layer of the cable may thereby extend shielding provided by the reference solution 120 and shield 156 to the meter connection.

Figure 6:
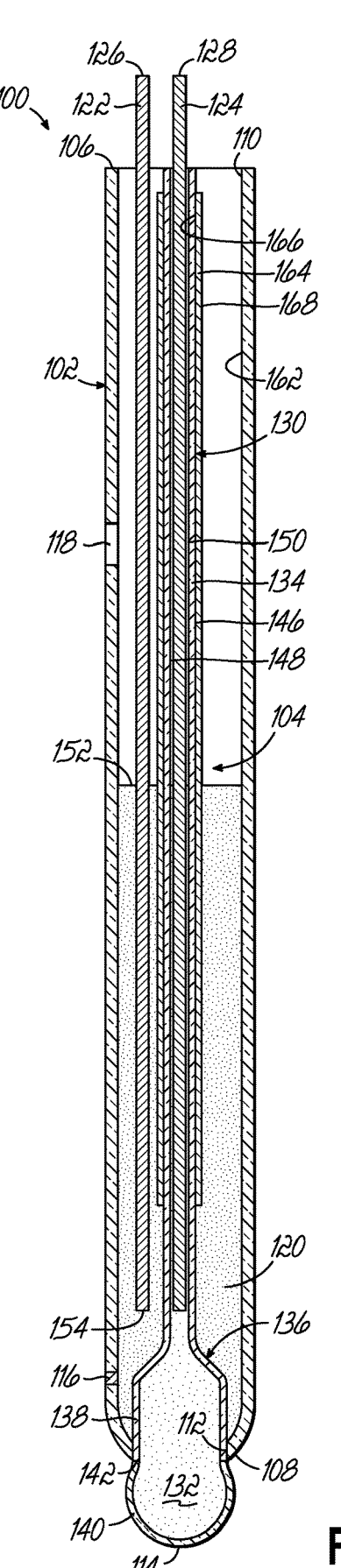
FIG. 6 is a vertical cross-sectional view of an exemplary probe in accordance with another embodiment of the present invention.
Figure 7:
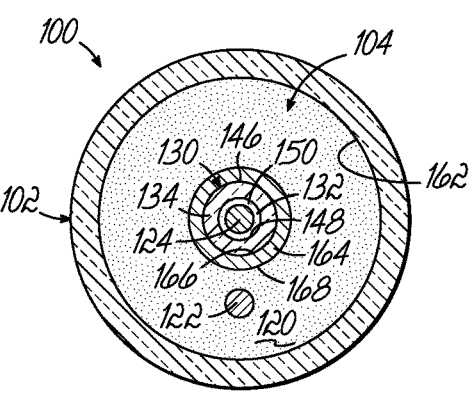
FIG. 7 is a horizontal cross-sectional view of the probe of FIG. 6.

FIGS. 6 and 7 are cross-sectional views taken along respective lines 3 and 4 of FIG. 2 for an alternative embodiment of the probe 100. This embodiment replaces the shield 156 depicted in FIGS. 3-5 with an electro-magnetic shield 164 having an inner surface 166 and an outer surface 168. The shield 164 comprises a layer of conductive material deposited on, or otherwise in contact with, the outer surface 146 of stem 134. For example, the shield 164 may be provided by length of tubing inserted over the inner body 130 having an inside diameter the same as or slightly larger than the outside diameter of the stem 134. The shield 164 may extend along the length of the inner body 130 from below the top surface 152 of reference solution 120 to, or just short of, the upper end 106 of outer body 102. As described above with respect to FIGS. 3-5, the shield 164 may extend shielding of the sensor assembly 104 provided by the reference solution 120 above the top surface 152 of reference solution 120. In an embodiment of the present invention, the shield 164 may be electrically coupled to the ground conductor of a cable connecting the probe 100 to the meter as described above with respect to shield 156.

Figure 8:
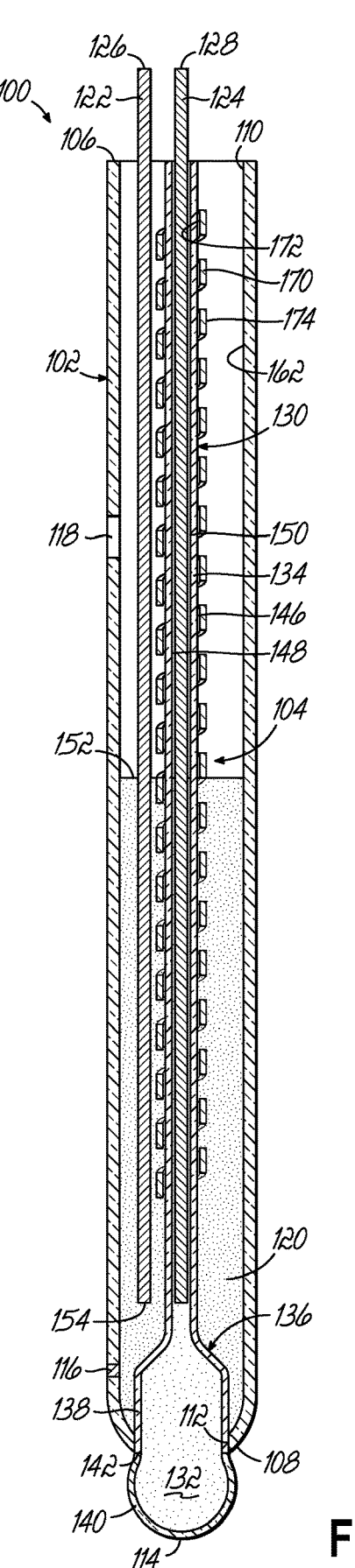
FIG. 8 is a vertical cross-sectional view of an exemplary probe in accordance with yet another embodiment of the present invention.
Figure 9:
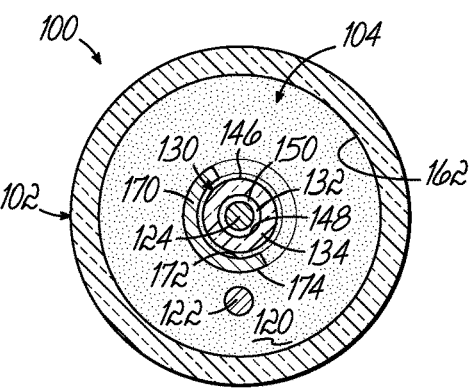
FIG. 9 is a horizontal cross-sectional view of the probe of FIG. 8.

FIGS. 8 and 9 are cross-sectional views taken along respective lines 3 and 4 of FIG. 2 for another alternative embodiment of the probe 100. This embodiment replaces the shield 164 depicted in FIGS. 6 and 7 with an electro-magnetic shield 170 having an inner surface 172, an outer surface 174, and a helical shape. The shield 170 comprises a layer of conductive material deposited on, or otherwise in contact with, the outer surface 146 of stem 134 in the shape of a circular helix. The shield 170 may be manufactured, for example, by wrapping a length of conductive material around a rod having a diameter about the same as the outside diameter of the stem 134 of inner body 130, and then sliding the resulting helix over the stem 134. The shield 170 may also be deposited on the stem 134 and selectively etched to define the helix, or deposited using a mask to prevent conductive material from covering areas of the stem 134 between adjacent portions of the helix.

In any case, the shield 170 may extend along the length of the inner body 130 from below the top surface 152 of reference solution 120 to, or just short of, the upper end 106 of outer body 102. As described above with respect to FIGS. 3-7, the shield 170 may extend shielding of the sensor assembly 104 provided by the reference solution 120 above the top surface 152 of reference solution 120. In an embodiment of the present invention, the shield 170 may be electrically coupled to the ground conductor of a cable connecting the probe 100 to the meter as described above with respect to other embodiments of the shield 156, 164.

Figures 10, 11:
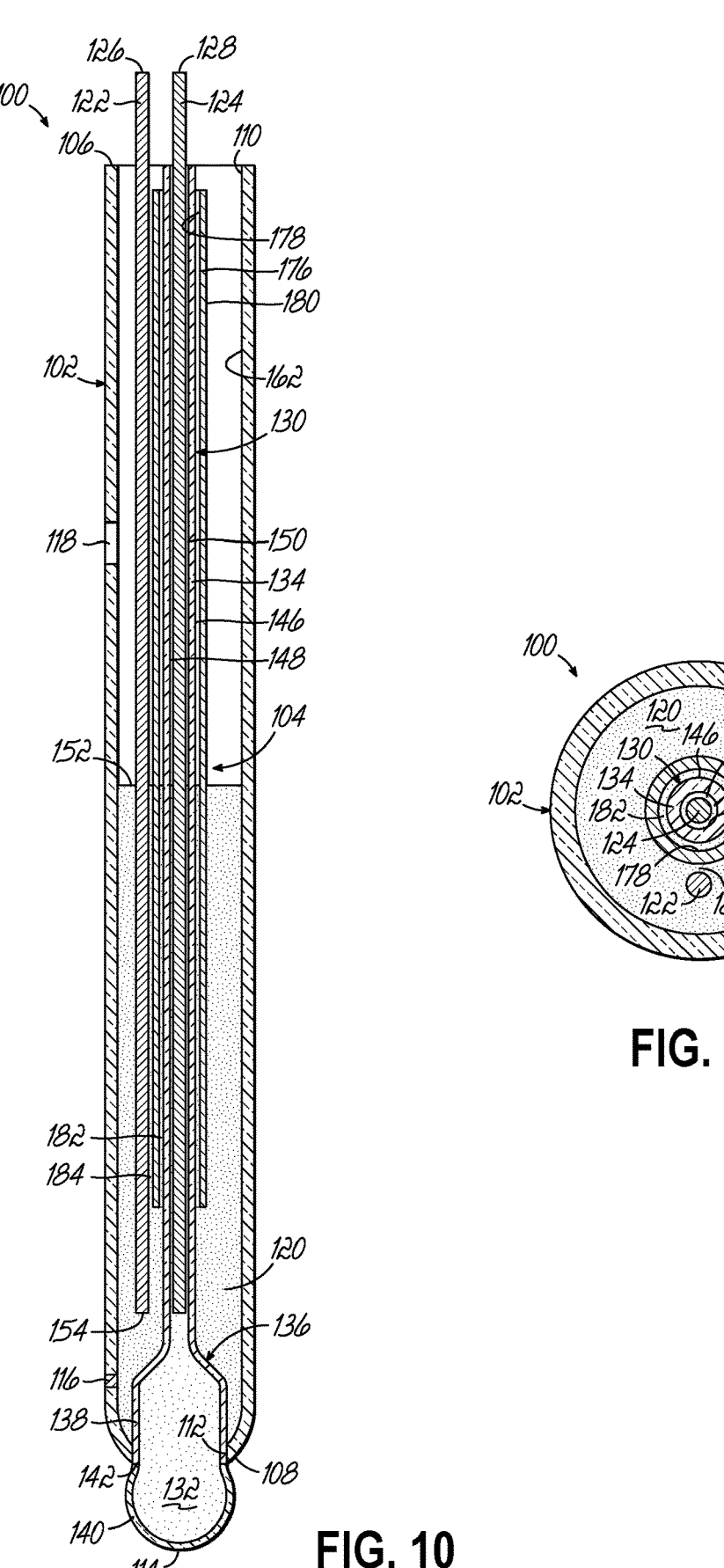
FIG. 10 is a vertical cross-sectional view of an exemplary probe in accordance with yet another embodiment of the present invention.
FIG. 11 is a horizontal cross-sectional view of the probe of FIG. 10.

FIGS. 10 and 11 are cross-sectional views taken along respective lines 3 and 4 of FIG. 2 for an yet another alternative embodiment of the probe 100. This embodiment replaces the shield 156 depicted in FIGS. 3-5 with an electro-magnetic shield 176 having an inner surface 178 and an outer surface 180. The shield 176 comprises a tube of conductive material separated from the outer surface 146 of stem 134 by a gap 182, and separated from the reference electrode 122 by a gap 184. In an alternative embodiment, the diameter of the shield 176 may be sufficient so that both the stem 134 and reference electrode 122 are encircled by the shield 176, in which case the reference electrode 122 would be positioned between the inner surface 178 of shield 176 and the outer surface 146 of stem 134.

The shield 176 may comprise a length of conductive tubing inserted over the inner body 130 having an inside diameter somewhat larger (in the case where the shield 176 is between the reference electrode 122 and the stem 134) or significantly larger (in the case where the shield encircles both the reference electrode 122 and the stem 134) than the outside diameter of the stem 134 of inner body 130. The shield 176 may be located laterally relative to the outer body 102, reference electrode 122, or the stem 134 by one or more spacers (not shown). The shield 176 may extend along the length of the inner body 130 from below the top surface 152 of reference solution 120 to, or just short of, the upper end 106 of outer body 102. As described above with respect to FIGS. 3-9, the shield 176 may extend shielding of the sensor assembly 104 provided by the reference solution 120 above the top surface 152 of reference solution 120. In an embodiment of the present invention, the shield 176 may be electrically coupled to the ground conductor of a cable connecting the probe 100 to the meter as described above with respect to other embodiments of the shield 156, 164, 170.

The shields described herein may formed by a continuous covering of conductive or semi-conductive material, or by a non-continuous covering. Exemplary non-continuous coverings may include, but are not limited to, lattices, screens, perforated sheets, or other patterns of one or more electrically coupled conductive elements. Although the shields are generally depicted above as having a cylindrical shape, embodiments of the invention are not so limited. For example, shields may have elliptical, polygonal, or other cross sections, and may have cross sections that vary in size or shape along the length of the shield.

The conductive material from which the shields are made can include one or more metals generally known as suitable for electrodes, such as, but not limited to, silver, gold, platinum, copper, titanium, and alloys thereof. For embodiments in which the shield is deposited as a layer on a substrate (e.g., on the inner surface 162 of outer body 102 or the outer surface 146 of stem 134), the shield may also include an adhesion-enhancing layer that is deposited on the substrate prior to deposition of the bulk conductive material. Exemplary materials that may be used for the adhesion-enhancing layer include one or more of titanium, chromium, molybdenum, tantalum, tungsten, gold, and palladium.

The conductivity required for a conductive coating on either the outer body 102 or inner body 130 to provide effective shielding may be relatively low. That is, the conductive coating can be either highly conductive (e.g., a metal) or only semi-conductive (e.g., a semi-conductor). Coating materials with a resistance as high as 127 $\Omega$-m have been shown to provide effective shielding. Thus, shields may also be formed from non-metallic substances, such as ceramics. For example, shields may be fabricated from indium-tin-oxide, which, in addition to having more than sufficient conductivity, is both optically transparent and durable. Titanium may also be used as the conductive material where the coating is in continuous contact with the reference solution 120 due to titanium's excellent chemical compatibility and adhesion to glass.

For embodiments in which the shield is applied as a coating, the coating may be applied to the substrate using any suitable method or combination of methods, such as physical vapor-phase deposition (PVD), chemical vapor-phase deposition (CVD), electro-chemical plating, electroless plating, sputtering, by application of a liquid composition that converts to a solid film by evaporation of a solvent or through a chemical reaction, or any other suitable method of depositing conductive materials.

Advantageously, embodiments of the present invention in which shields are defined by depositing a conductive coating on the inner surface 162 of outer body 102 or the outer surface 146 of inner body 130 may provide more effective shielding to the sensor assembly 104 than conventional methods of shielding. Deposited conductor shielding may also improve manufacturability, maintain a clean look characteristic of glass electrodes, and enable probes 100 with few or no interconnection wires in the compact portion of the probe 100 where effective shielding is difficult.

Shields in accordance with embodiments of the present invention may extend along the length of the probe 100 from below the top surface 152 of reference solution 120 upward to, or just short of, the upper end 106 of outer body 102. Shields may extend from below the top surface 152 of reference solution 120 so that the shields are in contact with the conductive reference solution 120. Shields may thereby be galvanically coupled to the reference potential of the probe 100. Embodiments of the present invention thereby preserve the existing level of shielding provided to the signal received from the membrane 114 by the reference solution 120, while adding additional shielding above and below the top surface 152 of reference solution 120. The shield may thereby extend shielding of the sensor assembly 104 provided by the reference solution 120 above the top surface 152 of reference solution 120, which is normally limited to a level below the fill hole 118. The shield may also be electrically coupled to a ground conductor of a cable connecting the probe 100 to the meter, e.g., through a connector (not shown) configured to be operatively coupled to an outer conductor of a coaxial cable (not shown).

Another advantage of embodiments of the present invention is that when a conductive coating is deposited on the inner or outer body, the conductive coating effectively extends the shield to a point both well below and well above the fill hole 118. The shield thereby provides full shield coverage even when the reference solution is low, and extends shielding above the maximum solution fill level, which is limited by the position of the fill hole 118. Since the coating is in contact with the reference solution, no physical wiring is required to complete the shield connection, and the sensor assembly 104 can be installed more simply as compared to probes lacking this feature.

In yet another embodiment of the present invention, an outer surface of the outer body 102 may be coated with a transparent conductive material, such as indium-tin-oxide. The coating of conductive material may be applied from the upper end 106 of the outer body 102 to a region that terminates below the fill hole 118 but above the probe immersion point. The coating of conductive material may be electrically coupled to the shield at a point inside a screw cap using conductive epoxy, a spring connection, or any other suitable method that enables simple, reliable assembly. Use of a clear coating of conductive material on a glass outer body may preserve the esthetics of the probe while greatly enhancing immunity to external noise.

Conductive materials that come into contact with the reference solution should be chemically compatible with the solution. Compatible materials may include titanium, metal coated plastic films, and indium-tin-oxide coated plastic films. These films may be flexible enough to wrap around the inner or outer body, or to form a tube. For example, a conductive film may be installed by wrapping the film around or forming a tube around the inner body 130 that is in contact with the reference solution. As in the coated inner body version, the shield's connection to the reference may be made through the reference solution, eliminating the need for a wired shield connection. In another embodiment, the conductive film may be installed by forming a tube conforming to the inner surface 162 of outer body 102.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but does not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising". In addition, the dimensions some parts of the drawings may not be drawn to scale, or may be exaggerated for the sake of clarity.

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A probe for measuring a first solution, the probe comprising:
   an outer body including an inner surface and configured to receive an operational amount of a second solution, the second solution including a top surface;
   a sensor assembly including an inner body having an outer surface, at least a portion of the inner body being located inside the outer body;
   a shield comprising a layer of conductive material positioned between the outer surface of the inner body and the inner surface of the outer body so that the shield encircles the sensor assembly, the shield being configured to be in contact with the second solution and extend above the top surface of the second solution when the probe is filled with the operational amount of the second solution during use of the probe;
   a connector including a ground conductor,
   wherein the shield is electrically coupled to the ground conductor of the connector; and
   a reference electrode, wherein the reference electrode is electrically coupled to the ground conductor of the connector,
   wherein the inner body comprises a lower end including a chamber having an upper portion and a lower portion, the lower portion of the chamber being defined by a membrane that is joined to the upper portion of the chamber so that a joint is formed between the membrane and the upper portion of the chamber,
   wherein the outer body includes an upper end and a lower end,
   wherein the inner body and the outer body are configured so that there is a fluid-tight seal between the inner body and the outer body that defines an outer chamber extending from the lower end of the outer body toward the upper end and formed between the inner surface of the outer body and the outer surface of the inner body and sealed by the fluid-tight seal, and
   wherein the reference electrode is immersed in the second solution disposed in the outer chamber.

2. The probe of claim 1, wherein the reference electrode is positioned in the outer chamber so that there is a first gap between the shield and the reference electrode.

3. The probe of claim 2, wherein the shield has an inner surface, and the first gap is between the reference electrode and the inner surface of the shield.

4. The probe of claim 2, wherein the shield has an outer surface, and the first gap is between the reference electrode and the outer surface of the shield.

5. The probe of claim 1, wherein the shield is electrically coupled to the reference electrode through the second solution when the probe is filled with the operational amount of the second solution.

6. The probe of claim 1, wherein the shield extends above the top surface of the second solution to the connector.

7. The probe of claim 1, wherein the shield is electrically coupled to the ground conductor of the connector at the connector.

8. The probe of claim 1, wherein the shield is electrically coupled to the ground conductor of the connector through the second solution and the reference electrode.

9. The probe of claim 1, further comprising:

a liquid junction configured to electrically couple electric charge between the first solution and the second solution when the probe is filled with the operational amount of the second solution and immersed in the first solution during use of the probe.

10. The probe of claim 9, wherein the shield is electrically coupled to a meter ground through the second solution and the liquid junction.

11. The probe of claim 1, wherein the joint between the membrane and the upper portion of the chamber is below the fluid-tight seal so that the membrane does not contact the second solution when the probe is filled with the operational amount of the second solution.

12. The probe of claim 1, wherein the membrane comprises a first material that allows ion exchange, and the upper portion of the chamber comprises a second material that is electrically insulating.

13. The probe of claim 1, wherein the sensor assembly further includes:

a third solution inside the inner body; and a sensing electrode at least a portion of which is inside the inner body and in contact with the third solution.

14. The probe of claim 1, wherein the shield is in contact with the outer surface of the inner body.

15. The probe of claim 1, wherein the shield has an inner surface and an outer surface, and there is a second gap between the inner surface of the shield and the outer surface of the inner body, and a third gap between the outer surface of the shield and the inner surface of the outer body.

16. The probe of claim 1, wherein the shield comprises a material having a resistance of up to 127 $\Omega$-m.

17. The probe of claim 1, wherein the second solution is a conductive reference solution.

18. The probe of claim 1, wherein the shield is electrically coupled, free of wiring, to the second solution.

19. A probe for measuring a first solution, the probe comprising:

an outer body having an inner surface and being configured to receive an operational amount of a second solution, the operational amount of the second solution including a top surface;

a sensor assembly comprising an inner body having an outer surface, at least a portion of the inner body being located within the outer body; and a conductive shield disposed between the outer body and the sensor assembly, the shield being positioned so as to (1) contact the second solution received by the outer body and (2) extend above the top surface of the second solution when the probe is filled with the operational amount of the second solution, wherein the outer body includes an upper end and a lower end, wherein the inner body and the outer body are configured so that there is a fluid-tight seal between the inner body and the outer body that defines a chamber extending from the lower end toward the upper end and formed between the inner surface of the outer body and the outer surface of the inner body and sealed by the fluid-tight seal, and wherein the probe comprises a reference electrode immersed in the second solution disposed in the chamber.

* * * * *